US005462231A

United States Patent [19]

Hall

[11] Patent Number: 5,462,231

[45] Date of Patent: Oct. 31, 1995

[54] COIL FOR SMALL DIAMETER WELDED FUEL INJECTOR

[75] Inventor: Bryan C. Hall, Newport News, Va.

[73] Assignee: Siemens Automotive L.P., Auburn Hills, Mich.

[21] Appl. No.: 292,456

[22] Filed: Aug. 18, 1994

[51] Int. Cl.$^6$ .................................................. F16K 31/06

[52] U.S. Cl. .................................. 239/585.4; 251/129.21

[58] Field of Search ............................ 239/585.1–585.5; 251/129.21, 129.18, 129.15

[56] References Cited

U.S. PATENT DOCUMENTS

| | | | |
|---|---|---|---|
| 4,984,744 | 1/1991 | Babitzka et al. | 239/585.4 |
| 5,165,656 | 11/1992 | Maier et al. | 239/585.4 X |
| 5,178,362 | 1/1993 | Vogt et al. | 239/585.1 X |
| 5,207,387 | 5/1993 | Bergstrom | 239/585.4 |
| 5,217,204 | 6/1993 | Maier et al. | 251/129.21 X |

*Primary Examiner*—Andres Kashnikow
*Assistant Examiner*—Lesley D. Morris
*Attorney, Agent, or Firm*—Russel C. Wells

[57] ABSTRACT

The fuel inlet tube of a top-feed fuel injector has a larger O.D. proximate its inlet end than it does at its opposite end where a tubular non-ferromagnetic part is laser-welded to it. The through-hole in the coil's bobbin has a smaller diameter portion and a larger diameter portion, the larger diameter portion being disposed closer to the fuel inlet tube's inlet than is the smaller diameter portion. The larger diameter portion of the bobbin's through-hole and the smaller outside diameter portion of the fuel inlet tube are mutually axially overlapping to an extent that, during the fabrication process, the coil assembly can be disposed axially on the fuel inlet tube to a position allowing the laser-welding to be performed, and thereafter the coil assembly disposed to cover the laser-welded joint.

26 Claims, 2 Drawing Sheets

56
58
16
12
60
10
54
52
14
80
74
36
78
50
88
82
86
34
18
46
94
90
48
66
84
72
20
26
62
96
98
68
28
69
70
64
22
32
65
30
24
44
38A
38A
38
43
40
42
41
38B

COIL FOR SMALL DIAMETER WELDED FUEL INJECTOR

FIELD OF THE INVENTION

This invention relates to solenoid operated fuel injectors that are used in fuel injection systems of internal combustion engines.

BACKGROUND AND SUMMARY OF THE INVENTION

One means for reducing the overall diameter of a fuel injector comprises using hermetic laser welds instead of O-ring seals at certain joints. This allows certain individual parts which are typically metallic and tubular in shape to be of smaller diameters. The electromagnetic coil assembly that is used for operating the fuel injector must also be made smaller in diameter in order to achieve the desired reduction in overall diameter of the fuel injector. But in order to maintain injector performance, the effectiveness of the coil assembly must not be compromised in the process, meaning for instance that the number of ampere-turns of the coil should not be reduced. Consequently, a reduction in the diameter of the coil assembly might have to be at the expense of an increase in overall length for the coil assembly. Such an increase in length may not necessarily be objectionable, but when accompanied by reduction in the diameter of the coil assembly, it may have a definite influence on other constructional aspects of the fuel injector and/or on the sequence in which various parts are assembled during the injector fabrication process.

The present invention relates to both a novel construction of, and a novel process for fabricating, a solenoid operated fuel injector that enables a smaller overall diameter to be realized through the use of laser welding without sacrificing injector performance. Briefly, the invention comprises providing the through-hole in the non-ferromagnetic bobbin of the electromagnetic coil assembly with respective relatively larger and relatively smaller diameter portions, and also providing the stator that passes through the bobbin through-hole with respective relatively larger and relatively smaller outside diameter portions. In a top-feed fuel injector, the stator that passes through the bobbin through-hole is the fuel injector's ferromagnetic fuel inlet tube, and this fuel injector will be the example used to disclose the invention in the ensuing description.

The relatively larger outside diameter portion of the fuel inlet tube of such a top-feed fuel injector is disposed between the fuel inlet opening at one end of the fuel inlet tube and the relatively smaller outside diameter portion. The relatively larger diameter portion of the bobbin through-hole is at the end of the electromagnetic coil assembly that is toward the fuel inlet opening of the fuel inlet tube. The fuel inlet tube and the electromagnetic coil assembly are assembled by inserting the end of the fuel inlet tube that is opposite the end containing the fuel inlet opening into the relatively larger diameter portion of the bobbin's through-hole and passing the fuel inlet tube through that through-hole until the larger diameter portion of the through-hole comes into press-fit engagement with the larger outside diameter portion of the fuel inlet tube. As the smaller outside diameter portion of the fuel inlet tube was passing through the larger diameter portion of the bobbin's through-hole during initial insertion, it eventually reached the smaller diameter portion of the through-hole. The smaller diameter portion of the through-hole is just slightly larger than the smaller outside diameter portion of the fuel inlet tube so that it acted to coaxially guide continued passage of the fuel inlet tube through the bobbin's through-hole until the aforementioned press-fitting was attained. The fuel inlet tube has a sufficient overall length that a certain amount of the smaller outside diameter portion of the fuel inlet tube protruded beyond the smaller diameter portion of the bobbin's through-hole when the aforementioned press-fitting occurred. The respective transitions between the larger and smaller portions of the bobbin's through-hole and between the larger and smaller outside diameter portions of the fuel inlet tube are in the form of complementary tapered shoulders that are adapted to mutually abut and define the extent to which the bobbin and the fuel inlet tube can be axially press-fitted, and when such abutment occurred, the amount by which the smaller outside diameter portion of the fuel inlet tube protruded from the smaller diameter portion of the bobbin was established. This amount is chosen to be sufficient to provide for a short neck of a non-ferromagnetic metal shell to be telescoped over a neck at the protruding end of the fuel inlet tube and joined thereto in a hermetically sealed manner, preferably by laser welding, so that the outside of the neck of the non-ferromagnetic shell was flush with the outside of the smaller diameter portion of the fuel inlet tube. The aforementioned press-fit of the bobbin on the fuel inlet tube assured that the electromagnetic coil assembly would be held clear of the weld zone during welding of the non-ferromagnetic shell to the ferromagnetic fuel inlet tube. After welding, the electromagnetic coil assembly was displaced axially relative to the fuel inlet tube to break the press-fit of the bobbin from the fuel inlet tube and bring the smaller diameter portion of the bobbin's through-hole into covering relation to the laser weld, and the electromagnetic coil assembly was axially located in a desired final position by its abutment with a shoulder of the non-ferromagnetic shell that extends radially outward from the non-ferromagnetic shell's telescopic engagement with the fuel inlet tube.

This novel construction intentionally precludes the possibility of assembling the fuel inlet tube and the smaller diameter coil assembly by first inserting the inlet end of the fuel inlet tube into the smaller diameter portion of the bobbin's through-hole, but by precluding this possibility, it provides a novel process for fabrication of a smaller diameter fuel injector that is embodied in the scope of the present invention. Since the presence of the shoulder of the non-ferromagnetic shell is necessary in this particular fuel injector, such a smaller diameter electromagnetic coil assembly could not be used if it were necessary for the non-ferromagnetic shell to be joined to the ferromagnetic fuel inlet tube before the coil assembly had been placed onto the fuel inlet tube since the diameter of the bobbin's through-hole would have to be large enough to fit over the shoulder of the non-ferromagnetic shell, and as a consequence, the overall diameter of the coil assembly would have to be made larger too. The particular sequence of steps described herein therefore constitutes an inventive process aspect for fabricating a fuel injector.

Various features, advantages and the inventive aspects will be seen in the ensuing description and claims which are accompanied by drawings that disclose a presently preferred exemplary embodiment of the invention according to the best mode contemplated at the present time for carrying out the invention.

DESCRIPTION OF THE PREFERRED EMBODIMENT

Figure 1:
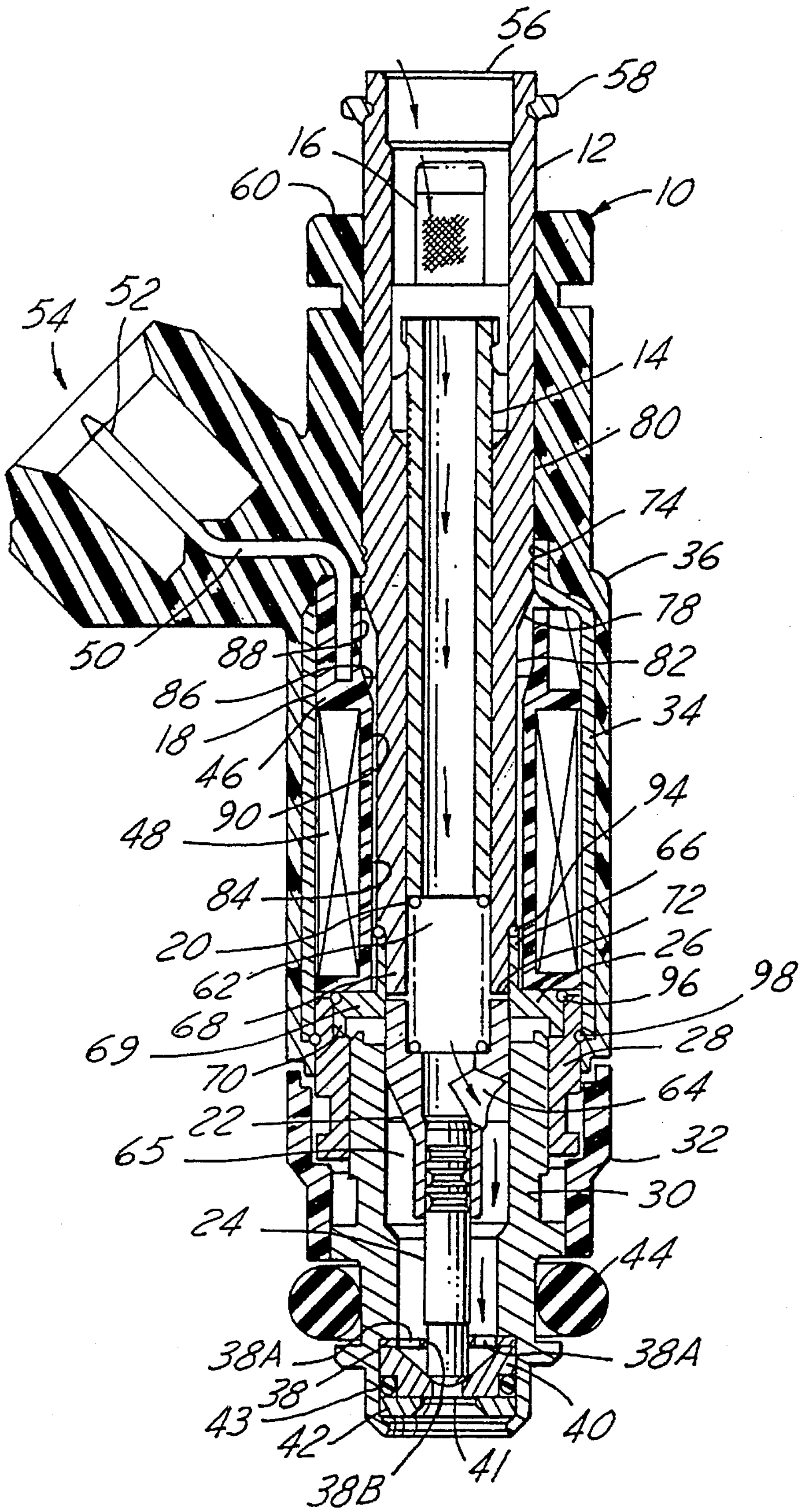
FIG. 1 is a longitudinal cross-sectional view through an exemplary fuel injector embodying principles of the present invention.

FIG. 1 shows an exemplary fuel injector 10 comprising a number of parts including a fuel inlet tube 12, an adjustment tube 14, a filter assembly 16, an electromagnetic coil assembly 18, a coil spring 20, an armature 22, a needle valve 24, a non-magnetic shell 26, a valve body shell 28, a valve body 30, a plastic shell 32, a coil assembly housing 34, a non-metallic cover 36, a needle guide member 38, a valve seat member 40, a thin disk orifice member 41, a backup retainer member 42, a small O-ring seal 43, and a large O-ring seal 44.

Parts 38, 40, 41, 42, and 43 form a stack that is disposed at the nozzle end of fuel injector 10, as shown in a number of commonly assigned patents, such as U.S. Pat. No. 5,174,505. Armature 22 and needle valve 24 are joined together to form an armature/needle sub-assembly. Coil assembly 18 comprises a plastic bobbin 46 on which an electromagnetic coil 48 is wound. Respective terminations of coil 48 connect to respective terminals 50, 52 that are shaped and, in cooperation with a surround formed as an integral part of cover 36, to form an electric connector 54 for connecting the fuel injector to an electric control circuit (not shown) that operates the fuel injector.

Fuel inlet tube 12 is ferromagnetic and comprises a fuel inlet opening 56 at the exposed upper end. A ring 58 that is disposed around the outside of fuel inlet tube 12 just below fuel inlet opening 56 cooperates with an end surface 60 of cover 36 and the intervening O.D. of tube 12 to form a groove for an O-ring seal (not shown) that is typically used to seal the fuel injector inlet to a cup, or socket, in an associated fuel rail (not shown). The lower O-ring 44 is for providing a fluid-tight seal with a port in an engine induction intake system (not shown) when the fuel injector is installed on an engine. Filter assembly 16 is fitted to the open upper end of adjustment tube 14 in conventional manner to filter any particulate material larger than a certain size from fuel entering through inlet opening 56 before the fuel enters adjustment tube 14.

In the calibrated fuel injector, adjustment tube 14 has been pressed axially to an axial position within fuel inlet tube 12 that compresses spring 20 to a desired bias force that urges the armature/needle such that the rounded tip end of needle valve 24 is seated on valve seat member 40 to close the central hole through the valve member seat. Preferably, tubes 14 and 12 are crimped together to maintain their relative axial positioning after adjustment calibration has been performed.

After passing through adjustment tube 14, fuel enters a space 62 that is cooperatively defined by confronting ends of inlet tube 12 and armature 22 and that contains spring 20. Armature 22 comprises a passageway 64 that communicates space 62 with a passageway 65 in valve body 30, and guide member 38 contains fuel passage holes 38A whereby fuel can flow from space 62 to valve seat member 40. This fuel flow path is indicated by the succession of arrows in FIG. 1.

Non-ferromagnetic shell 26 is telescopically fitted on and joined to the lower end of inlet tube 12. Shell 26 has a tubular neck 66 that telescopes over a tubular neck 68 at the lower end of fuel inlet tube 12. Shell 26 also has a shoulder 69 that extends radially outwardly from neck 68. Shoulder 69 itself has a short circular rim 70 at its outer margin extending axially toward the nozzle end of the injector. Valve body shell 28 is ferromagnetic and is joined in fluid-tight manner to non-ferromagnetic shell 26, preferably by laser welding.

The upper end of valve body 30 fits closely inside the lower end of valve body shell 28 and these two parts are joined together in fluid-tight manner, preferably by laser welding. Armature 22 is guided by the inside wall of valve body 30 for axial reciprocation and further axial guidance of the armature/needle sub-assembly is provided by a central guide hole 38B in member 38 through which needle valve 24 passes.

In the closed position shown in FIG. 1, a small working gap 72 exists between the annular end face of neck 68 of fuel inlet tube 12 and the confronting annular end face of armature 22. Coil housing 34 and tube 12 are in contact at 74 and constitute a stator structure that is associated with coil assembly 18. Non-ferromagnetic shell 26 assures that when coil 48 is energized, the magnetic flux will follow a path that includes armature 22. Starting at the lower axial end of housing 34, the magnetic circuit extends through valve body shell 28 and valve body 30 to armature 22, and from armature 22 across working gap 72 to inlet tube 12. When coil 48 is energized, the spring force on armature 22 is overcome and the armature is attracted toward inlet tube 12 reducing working gap 72. This unseats needle valve 24 from value seat 40 to open the fuel injector so fuel is now injected from the injector's nozzle. When the coil ceases to be energized, spring 20 pushes the armature/needle closed on seat member 40.

Fuel inlet tube 12 is shown to comprise a frustoconical shoulder 78 that divides its O.D. into a larger diameter portion 80 and a smaller diameter portion 82. Bobbin 46 comprises a central through-hole 84 that has a frustoconical shoulder 86 that divides the through-hole into a larger diameter portion 88 and a smaller diameter portion 90. Shoulder 86 has a frustoconical shape complementary to that of shoulder 78.

FIG. 1 shows shoulders 78 and 86 to be axially spaced apart, and it also shows a portion of through-hole 84 and a portion of the O.D. of fuel inlet tube 12 to be mutually axially overlapping. That overlapping portion of through-hole 84 consists of shoulder 86 and a portion of the larger diameter portion 88 of the through-hole immediately above shoulder 86. That overlapping portion of the O.D. of tube 12 consists of shoulder 78 and a portion of the smaller diameter portion 82 of the tube. The significance of this will now become apparent upon consideration of FIGS. 2–4 which illustrate steps in the process of assembling coil assembly 18, fuel inlet tube 12, and shells 26 and 28.

Figure 2:
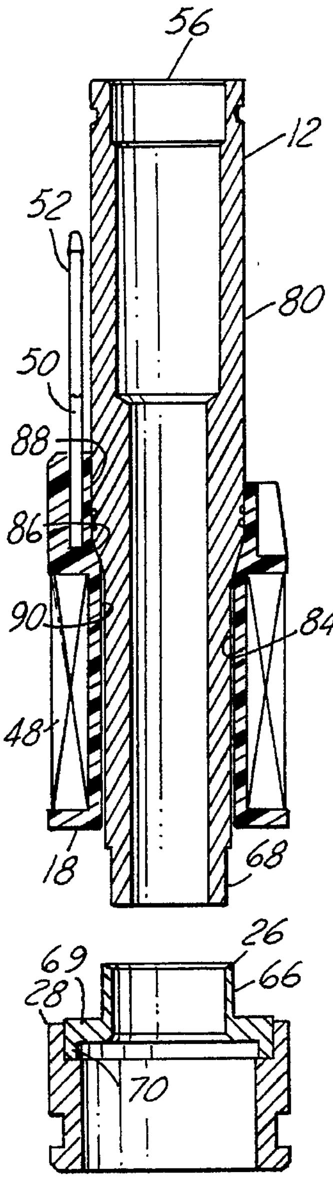
FIGS. 2, 3, and 4 are respective longitudinal cross-sectional views illustrating a sequence of steps occurring during fabrication of the fuel injector of FIG. 1.
Figure 3:
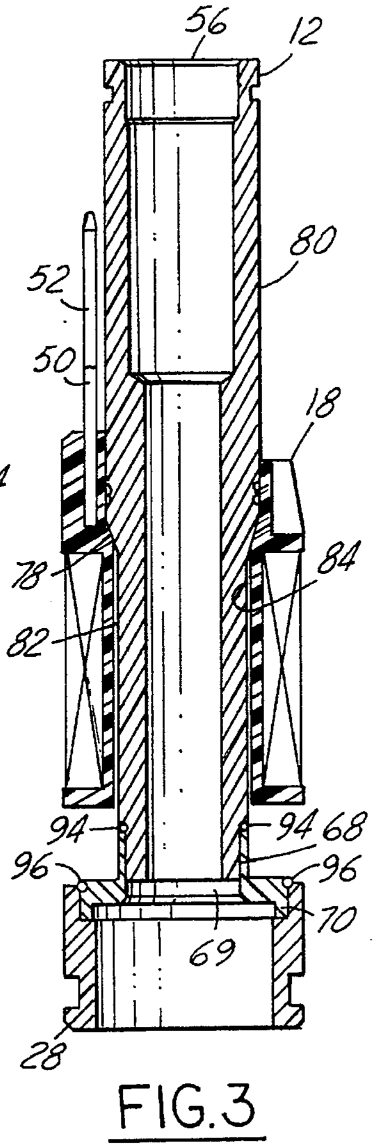
Figure 4:
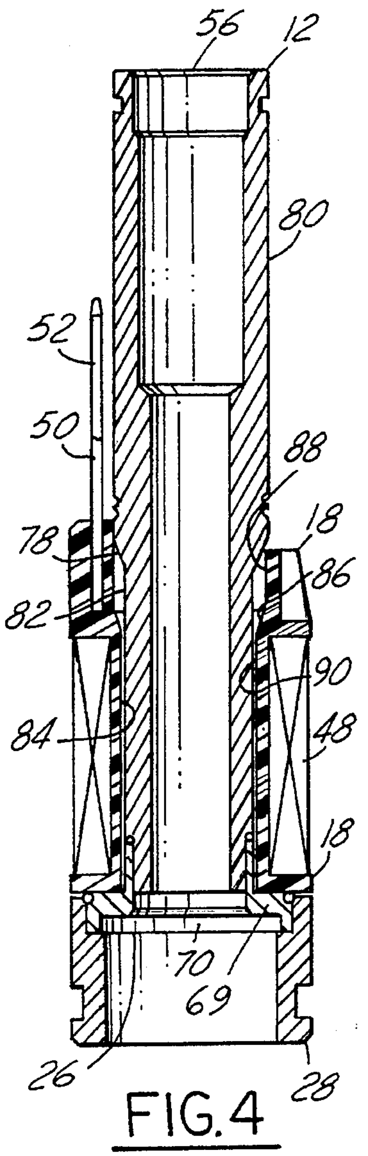

FIG. 2 shows the two shells 26, 28 to have already been telescopically fitted together and coil assembly 18 to have been disposed on tube 12. Terminals 50, 52 have not yet been formed to their final shapes. The disposition of coil assembly 18 on inlet tube 12 can be performed only by inserting the smaller diameter portion 82 into the larger diameter portion 88 of bobbin 46. FIG. 2 shows coil assembly 18 to have been positioned axially to mutually abut shoulders 78 and 86. This leaves the entire neck 68 protruding from bobbin 46. Coil assembly 18 is retained in this position by providing larger diameter portion 88 of bobbin through-hole 84 to have a press-fit with larger outside diameter portion 80 of tube 12 where they mutually axially overlap when shoulders 78 and 86 are in mutual abutment. The nature of the press-fit is not so tight as to prevent the shoulders 78, 86 from being abutted, thus providing a limit stop that limits the insertion of the inlet tube 12 into bobbin 46, but it is sufficiently tight to prevent relative movement of the two parts while further processing of the fuel injector is being performed. FIG. 3 shows some of that further processing.

Since neck 68 is clear of coil assembly 18, neck 66 of shell 26 can be telescoped onto it and the telescoped parts joined to each other, preferably laser welded together. The welds are portrayed by the reference numerals 94, 96. The welds extend around the full circumference of the parts and create hermetic, fluid-tight joints that are not in the fuel path through the fuel injector. Such placement of the welds avoids the possibility that they might introduce contamination into the fuel that could impair fuel injector performance. The O.D. of neck 66 is flush with the O.D. of tube 12 immediately above neck 68 so that after the welds have been created, coil assembly 18 can be slid axially on tube 12 from the FIG. 3 position to the FIG. 4 position, the press-fit not being so tight as to require an undue amount of force in order to break it.

In the latter position, the lower bobbin flange and shoulder 69 mutually abut, and it can be appreciated that this abutment serves to properly axially position coil assembly 18 in a desired final position on tube 12 the same as shown in FIG. 1 where the telescoped necks 66, 68 including weld 94, are disposed within smaller diameter portion 90 of bobbin through-hole 84. Coil assembly 18 is kept in this position covering the entire joint comprising the telescopically engaged necks 66, 68 and weld 94 by placing housing 34 over the parts as they appear in FIG. 4 and welding it in place as at 98 for example in FIG. 1, although housing 34 is itself not shown in FIG. 4. As can be seen in FIG. 1, the upper end of housing 34 is shaped to axially trap coil assembly 18 against shoulder 69. The fuel injector is thereafter completed by further assembly process steps that need not be described here in any detail since they do not directly pertain to the present invention.

While a presently preferred embodiment of the invention has been illustrated and described, it is to be appreciated that principles of the invention apply to all equivalent constructions and methods that fall within the scope of the following claims.

What is claimed is:

1. An electrically operated fuel injector for injecting fuel into an internal combustion engine comprising an internal passage within said fuel injector for conveying fuel from a fuel inlet at which fuel enters the fuel injector to a nozzle at which fuel is injected from the fuel injector, an electromagnetic coil assembly comprising a non-ferromagnetic bobbin having an axial through-hole and an electromagnetic coil disposed on said bobbin so as to be generally coaxial with said through-hole, a stator disposed in said bobbin's through-hole to form a portion of a stator structure that forms one part of a magnetic circuit for magnetic flux generated by said coil, a mechanism that is internal to said fuel injector for selectively opening and closing said internal passage and that includes an armature and a valve, said armature forming another part of said magnetic circuit through a working gap to said stator structure for enabling said armature to operate said valve in accordance with selective energizing of said coil to selectively open and close said internal passage, said armature being axially reciprocated toward and away from said stator structure by selective energizing of said coil, wherein said bobbin's through-hole comprises a smaller diameter portion and a larger diameter portion, said larger diameter portion is disposed axially more distant from said nozzle than is said smaller diameter portion, a tubular part is joined in fluid-tight relation to an end of said stator by means of a joint that is at least partially disposed within said smaller diameter portion of said bobbin's through-hole, said stator comprises a smaller outside diameter portion at said joint and a larger outside diameter portion that is disposed axially of said smaller outside diameter portion, said larger diameter portion of said bobbin's through-hole and said smaller outside diameter portion of said stator being mutually axially overlapping to an extent that, during process when the fuel injector was fabricated, enabled said electromagnetic coil assembly to be disposed axially on said stator to a position where both said larger diameter portion of said bobbin's through-hole and said larger outside diameter portion of said stator mutually axially overlapped to an extent that allowed said electromagnetic coil assembly to be disposed in a position leaving a sufficient axial extent of said end of said stator clear of said electromagnetic coil assembly so as to allow said joint to be created, and after creation of said joint, enabled said electromagnetic coil assembly to return to a position disposing at least a portion of said joint within said smaller diameter portion of said bobbin's through-hole.

2. A fuel injector as set forth in claim 1 wherein said tubular part is non-ferromagnetic.

3. A fuel injector as set forth in claim 2 wherein said tubular part and said end of said stator with which said tubular part is joined in fluid-tight relation are mutually telescopically engaged, said tubular part fits over said end of said stator at their mutual telescopic engagement, and a laser weld around an outside of said stator joins said tubular part and said stator.

4. A fuel injector as set forth in claim 3 wherein said laser weld is entirely disposed within said smaller diameter portion of said bobbin's through-hole.

5. A fuel injector as set forth in claim 4 wherein said tubular part comprises a shoulder extending radially outwardly of the tubular part's telescopic engagement with said end of said stator external to said end of said stator, and said electromagnetic coil assembly is in abutment with said shoulder.

6. A fuel injector as set forth in claim 3 wherein at their mutual telescopic engagement said end of said stator comprises a reduced diameter neck fitting inside a portion of said tubular part, and said portion of said tubular part has an outside diameter substantially equal to that of said smaller outside diameter portion of said stator such that said tubular part and said stator have a substantially flush fit.

7. A fuel injector as set forth in claim 1 wherein said tubular part and said end of said stator with which said tubular part is joined in fluid-tight relation are mutually telescopically engaged, said tubular part fits over said stator at their mutual telescopic engagement, said end of said stator comprises a reduced diameter neck fitting inside a portion of said tubular part, said portion of said tubular part has an outside diameter substantially equal to that of said smaller outside diameter portion of said stator such that said tubular part and said stator have a substantially flush fit, and a laser weld exterior to both said stator and said tubular part joins said stator and said tubular part.

8. A fuel injector as set forth in claim 7 wherein the entire laser weld is disposed within said smaller diameter portion of said bobbin's through-hole.

9. A fuel injector as set forth in claim 8 wherein said tubular part comprises a shoulder extending radially outwardly of the tubular part's telescopic engagement with said end of said stator external to said end of stator, and said electromagnetic coil assembly is in abutment with said shoulder.

10. A fuel injector as set forth in claim 9 wherein said tubular part is non-ferromagnetic.

11. A fuel injector as set forth in claim 1 wherein said larger diameter portion of said bobbin's through-hole is dimensioned for press-fit engagement with said larger outside diameter portion of said stator sufficient to have enabled said electromagnetic coil assembly to have been held axially on said stator by press-fitting said larger diameter portion of said bobbin's through-hole on said larger outside diameter portion of said stator during the creation of said joint, and thereafter said electromagnetic coil assembly to be displaced axially so as to separate said larger diameter portion of said bobbin's through-hole from press-fit on said larger outside diameter portion of said stator and be positioned so that said joint is within said smaller diameter portion of said bobbin's through-hole.

12. A fuel injector as set forth in claim 11 wherein said bobbin and said stator comprise means defining a limit stop limiting axial extent of such press-fit.

13. A fuel injector as set forth in claim 12 wherein said means defining a limit stop limiting axial extent of such press-fit comprises respective radially overlapping shoulders on said bobbin and said stator that are adapted to mutually abut to define the limit stop.

14. A fuel injector as set forth in claim 9 wherein said shoulders have respective complementary frustoconical shapes.

15. A fuel injector as set forth in claim 11 wherein said tubular part is non-ferromagnetic.

16. A fuel injector as set forth in claim 15 wherein said tubular part and said end of said stator with which said tubular part is joined in fluid-tight relation are mutually telescopically engaged, said tubular part fits over said end of said stator at their mutual telescopic engagement, said end of said stator comprises a reduced diameter neck fitting inside a portion of said tubular part, said portion of said tubular part has an outside diameter substantially equal to that of said smaller outside diameter portion of said stator such that said tubular part and said stator have a substantially flush fit, and a laser weld exterior to both said stator and said tubular part joins said stator and said tubular part.

17. A fuel injector as set forth in claim 11 wherein said tubular part and said end of said stator with which said tubular part is joined in fluid-tight relation are mutually telescopically engaged, said tubular part fits over said end of said stator at their mutual telescopic engagement, said end of said stator comprises a reduced diameter neck fitting inside a portion of said tubular part, said portion of said tubular part has an outside diameter substantially equal to that of said smaller outside diameter portion of said stator such that said tubular part and said stator have a substantially flush fit, and a laser weld exterior to both said stator and said tubular part joins said stator and said tubular part.

18. A fuel injector as set forth in claim 1 wherein said bobbin is a non-metallic material.

19. A fuel injector as set forth in claim 1 wherein said stator comprises a ferromagnetic fuel inlet tube containing said fuel inlet spaced along the length of said tube from an end of said tube that constitutes said end of said stator.

20. A process for fabricating an electrically operated fuel injector for injecting fuel into an internal combustion engine, said injector comprising an internal passage within said fuel injector for conveying fuel from a fuel inlet at which fuel enters the fuel injector to a nozzle at which fuel is injected from the fuel injector, an electromagnetic coil assembly comprising a non-ferromagnetic bobbin having an axial through-hole and an electromagnetic coil disposed on said bobbin so as to be generally coaxial with said through-hole, a stator disposed in said bobbin's through-hole to form a portion of a stator structure that forms one part of a magnetic circuit for magnetic flux generated by said coil, a mechanism that is internal to said fuel injector for selectively opening and closing said internal passage and that includes an armature and a valve, said armature forming another part of said magnetic circuit through a working gap to said stator structure for enabling said armature to operate said valve in accordance with selective energizing of said coil to selectively open and close said internal passage, said armature being axially reciprocated toward and away from said stator structure by the selective energizing of said coil, characterized by providing said bobbin's through-hole with a smaller diameter portion and a larger diameter portion, providing said stator with a smaller outside diameter portion and a larger outside diameter portion that is disposed axially of said smaller outside diameter portion, disposing said electromagnetic coil assembly on said stator such that said larger diameter portion of said bobbin's through-hole is axially more distant from said nozzle than is said smaller diameter portion of said bobbin's through-hole and said larger diameter portion of said bobbin's through-hole and said larger outside diameter portion of said stator mutually axially overlap to such an extent that allows said electromagnetic coil assembly to leave a certain axial extent of an end of said stator clear of said electromagnetic coil assembly, joining a tubular part in fluid-tight relation to said certain axial extent of said end of said stator at a joining location, and then disposing said electromagnetic coil assembly axially of said stator to a position disposing at least a portion of said joining location within said smaller diameter portion of said bobbin's through-hole.

21. A process as set forth in claim 20 wherein the joining step comprises mutually telescopically engaging said tubular part and said end of said stator such that said tubular part fits over said end of said stator, and laser welding around the outside of said stator to join said tubular part and said stator.

22. A process as set forth in claim 21 wherein the step of disposing said electromagnetic coil assembly axially of said stator to a position disposing at least a portion of said joining location within said smaller diameter portion of said bobbin's through-hole comprises disposing the entirety of a laser weld resulting from said laser welding within said smaller diameter portion of said bobbin's through-hole.

23. A process as set forth in claim 22 wherein said tubular part comprises a shoulder extending radially outwardly of the tubular part's telescopic engagement with said end of said stator external to said stator, and the step of disposing said electromagnetic coil assembly axially of said stator to a position disposing at least a portion of said joining location within said smaller diameter portion of said bobbin's through-hole comprises disposing said electromagnetic coil assembly in abutment with said shoulder.

24. A process as set forth in claim 20 wherein the step of disposing said electromagnetic coil assembly on said stator such that said larger diameter portion of said bobbin's through-hole and said larger outside diameter portion of said stator mutually axially overlap to an extent that allows said electromagnetic coil assembly to leave a certain axial extent of said end of said stator clear of said electromagnetic coil assembly comprises press-fitting said larger diameter portion of said bobbin's through-hole on said larger outside diameter portion of said stator sufficient to enable said electromagnetic coil assembly to be held axially on said stator by such press-fitting during the joining step.

25. A process as set forth in claim 24 wherein that the step of disposing said electromagnetic coil assembly axially of said stator to a position disposing at least a portion of said joining location within said smaller diameter portion of said bobbin's through-hole comprises breaking the press-fit of said larger diameter portion of said bobbin's through-hole with said larger outside diameter portion of said stator and then positioning said electromagnetic coil assembly such that at least of portion of said joint is disposed within said smaller diameter portion of said bobbin's through-hole.

26. A process as set forth in claim 24 wherein the press-fitting step is terminated by mutually abutting respective portions of said bobbin and said stator.

* * * * *